Jan. 15, 1957 A. N. A. AXLANDER 2,777,663
RADIATOR CONNECTING DEVICE
Filed Aug. 28, 1951
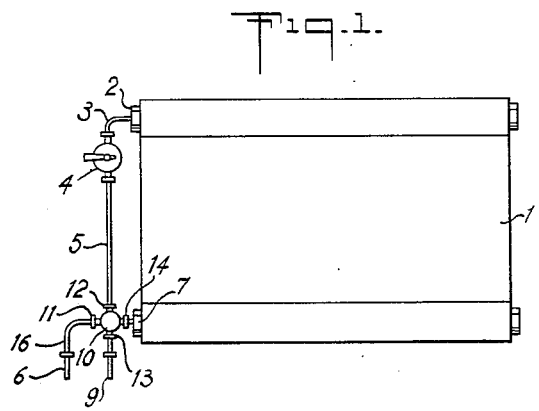
Fig.1.
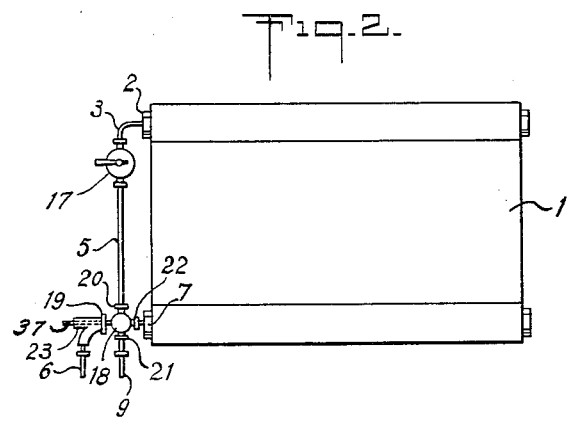
Fig.2.
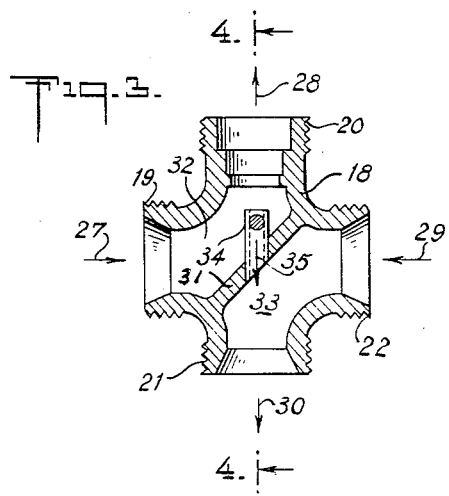
Fig.3.
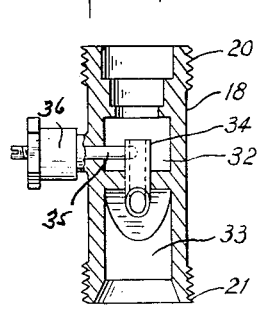
Fig.4.

United States Patent Office 2,777,663
Patented Jan. 15, 1957

2,777,663

RADIATOR CONNECTING DEVICE

Axel Nore Alexander Axlander, Stocksund, Sweden

Application August 28, 1951, Serial No. 244,009

Claims priority, application Sweden August 30, 1950

7 Claims. (Cl. 251—148)

This invention relates to a connecting device for radiators and the like simplifying their connection and reducing the cost for the installation, particularly in hot water systems.

Hitherto the connection of radiators has usually been made with connecting parts prepared at the site, as they must be adapted to comply with the local requirements. This kind of work means in itself a waste of time, which is still increased due to the unfavorable working conditions, usually occurring in buildings under construction and at similarly inconvenient working places.

These inconveniences are eliminated by the connecting device embodying the present invention, permitting the radiator to be preassembled with its connecting parts, so that the assembly may be connected at the site to the line with standardized pieces only.

A modified embodiment of the invention permits by-passing of the water when the radiator is shut off, so that the circulation in the pipes is maintained, even if the radiator valve is entirely closed. For this modified embodiment a radiator valve of simplified design may and should be used.

The principle of the invention is explained with reference to the drawings partly as a description of an example of performance, comprising Figs. 1 to 4.

Fig. 1 is a more or less diagrammatic front view of a radiator on a small scale, showing a connecting device embodying the invention.

Fig. 2 is a view similar to Fig. 1, showing a different form of the invention.

Fig. 3 is a sectional view on a much larger scale, of a connecting device of the kind shown in Fig. 2.

Fig. 4 is a sectional view taken on the line 4—4 of Fig. 3 and at right angles to the plane of Fig. 3, and illustrative of means for adjusting flow through a part of the connecting device.

In Fig. 1 a radiator 1 is provided with an inlet 2 and an outlet 7. The inlet 2 is connected to a hand operated control valve 4 by an elbow 3, and the valve 4 to the main supply line or a branch of it 6 by a piece of pipe 5. The outlet 7 is connected to the main return line or a branch of it 9.

The piece of pipe 5 must, in accordance with prior practice, be measured, cut off and prepared at the site, which is a time-wasting work, especially as it must have a good finish, since the parts are exposed to view.

By using a connecting device embodying the invention these inconveniences can be eliminated. Fig. 1 represents how it is used. The connecting device consists of a cross-shaped housing 10 with four pipe connections 11, 12, 13 and 14. Of these connections the connection 14 is directly attached to the outlet 7, the connection 11 by the elbow 16 to the main supply line branch 6, the connection 12 with a straight piece of pipe 5 to the inlet of the hand valve 4, and the connection 13 to the return line branch 9. The object of the invention itself will be explained in the following. The radiator can either be supplied with all the members assembled as shown in Fig. 1, or it can be delivered without these members, since they can easily be prepared in advance and their assembling at the site is made by means of screwed parts only. The number of different dimensions of radiators, as regards the height, is not very great, which means that stocking of pipe pieces 5 of different lengths will not be complicated. However, even a stock of parts is unnecessary if a thin metal tube 5 is used, that can easily be cut off to the exact length at the site.

The system according to the invention requires a control valve 4 including a throttling device for pre-adjustment of the flow resistance.

Fig. 2 shows a connection example similar to Fig. 1 but with the difference that a throttling valve 23 is added as a separate part, attached before the radiator in the direction of the flow.

The throttling valve 23 may as well be placed after the radiator outlet without changing its operation efficiency, and the place of the throttling valve may be a matter of available space. When the modified embodiment of the invention is used as in Fig. 2 the control valve 17 should not include any throttling device and its flow resistance should be small, especially for obtaining the result of by-passing as will be explained below, i. e. a flow of heating medium from the branch 6 to the branch 9 through the connection piece 18, even if the valve 17 is entirely shut off. Those parts in Fig. 2 that are of another form than the corresponding parts in Fig. 1 are marked with different numbers.

The embodiment of the invention is shown in Figs. 3 and 4 as a sectional view of the housing only, since the other parts are irrelevant. The housing 18 is in the form of a cross having threaded branches 19, 20, 21 and 22 adapted for connection respectively to the supply branch 6, pipe 5, outlet connection 7 and the return pipe 9. The housing 18 also embodies a diagonal partition 31 dividing the interior of the housing into two chambers 32 and 33. Also, the partition 31 carries a tube 34 projecting for some distance into the chamber 32 toward the center of the branch or connection 20. Tube 34 advantageously may be flush with the partition on the side of the chamber 33. Chamber 32 may be said to constitute an admission chamber and chamber 33 a discharge chamber. Branch 19 provides a supply delivery opening to the admission chamber and branch 20 provides a supply delivery opening from that chamber. Likewise, branch 22 provides a discharge admission opening to the discharge chamber and branch 21 provides a discharge delivery opening leading from that chamber.

The result of this arrangement is the following. At a certain liquid velocity through the radiator the static pressure in the chamber 32 is a certain amount higher than that in the chamber 33. On the other hand the returning flow according to the arrow 29 due to its velocity head exerts a dynamic pressure in the flush opening of the tube 34, the action of which is amplified by the suction around the edge of the tube 34 in the chamber 32, due to the current of liquid in said chamber. At a certain throttling degree of the valve 17 (Fig. 2) the static pressure is in balance with the dynamic pressure, and, practically, no liquid passes through the tube 34.

When this state is reached upon a certain throttling degree of the valve 17, the pump pressure and the rate of flow the flow passing the radiator is of no importance for the aforesaid state of balance between the static and the dynamic pressures, since the static pressure as well as the velocity head are both proportional to the square of the current velocity.

If, however, the valve 17 is somewhat closed, the static pressure difference between the chambers 32 and 33 increases but the dynamic pressure acting on the ends of the tube 34 decreases. Water then flows through the tube 34 as shown by the arrow 35. The more the valve 17 is closed, the greater becomes the velocity through the tube 34 and reaches its maximum, when the valve 17 is quite closed. The flow is then determined by the pressure difference and the size of the section of the tube 34.

The arrangement of the tube 34 is a characteristic for the invention. It admits the realizing of the dynamic pressure from the liquid, flowing as shown by the arrow 29, but it prevents the liquid flowing backwards into the radiator through the connection 22. The liquid passing the tube 34, when the valve 17 is throttled or closed, flows through the tube 34 due to its velocity direct out through the opening in the connection 21, following the direction of the arrow 30. This is an important feature for the complete shut-off of the radiator.

For adjusting a suitable aperture of the communication between the chambers 32 and 33 a throttling screw 35 may be provided, preferably perpendicular to the plane of the section shown in Fig. 3 passing through a conventional packing box 36 in the wall of the housing and with its stem projecting on its outside so that it can be handled without opening any connection.

Another embodiment is possible with the device shown in Fig. 2, namely a prolongation of the stem 37 in the throttling valve 23 into the housing 18 for adjusting the aperture between the chambers 32 and 33, whereby the throttling of the radiator and that of the by-pass are made simultaneously.

Many other embodiments are of course possible for the device, regulating the aperture between the chambers 32 and 33, with the object of permitting the adjustment from the outside.

As for the design, the invention can be performed in many different ways within its range. The arms of the crosses 10 and 18 may be disposed in other ways with other angles. As already mentioned the type of connections are irrelevant for the invention.

The connection piece need not be placed at the outlet of the radiator. It can as well be placed at the inlet with the necessary changes as for the connections.

The arrangement of the tube 34 shown in Fig. 3 enables the radiator to be shut-off entirely. It is sometimes desirable, however, to prevent a radiator from being shut-off entirely, for instance in case of risk for freezing. This can be obtained within the scope of the invention if the end of the tube 34 in the chamber 33 is turned towards the opening 22 in the connection. If the valve 17 is quite closed a jet of the incoming liquid will be directed opposite to the direction of the arrow 29. The warm water first rises in the radiator and then sinks to leave it in the direction of the arrow 29 beside or around the jet from the tube 34.

The use of the connection piece is of course not limited to radiators. It can be used also for other kinds of heaters, units etc., where the problems are similar. It is not necessary that the flowing medium be hot water. It can also be another liquid, steam or gas.

In the outer circuit the water quantity is always constant. The adjustment of the radiator valve can be varied without disturbance of the circulation in the outer circuit.

The radiator circuit can operate with pressure emanating from the pump in the outer circuit or even with thermal circulation.

The inner circuit always operates with small impelling forces. The regulation therefor can easily be arranged so that a uniform and correct scale is obtained on the radiator valve. With common valves great pressure drops are obtained when the throttling is strong but here the pressure drop over the valve always will be small.

Having thus described my invention, what I claim and desire to secure by Letters Patent is:

1. A connecting device for apparatus having an inlet adapted to be connected to a fluid supply conduit and an outlet adapted to be connected to a fluid return conduit, said device comprising a housing having an internal partition whereby to provide an admission chamber and a discharge chamber within the housing, said admission chamber having a supply delivery opening and a supply admission opening, said discharge chamber having a discharge admission opening and a discharge delivery opening, and means providing a passage extending through said partition and opening in the direction of flow from said supply admission opening to said supply delivery opening and forming a constriction in the path for flow of fluid through said admission chamber past said passage from said discharge delivery to said discharge admission opening of the admission chamber.

2. A device as defined in claim 1, in which said partition is in the form of a wall diagonally disposed with respect to the openings of said admission chamber and said means projects into the admission chamber to provide said restriction.

3. A device as defined in claim 1 in which the mouth of said passage opening into said discharge chamber is directed toward said discharge delivery opening of the discharge chamber and in which the plane of said mouth is angularly inclined with respect to the direction of flow of fluid into the discharge chamber from said discharge admission opening thereof.

4. A device as defined in claim 1 in which said partition comprises a wall diagonally disposed with respect to the openings in said discharge chamber and the mouth of said passage opening into the discharge chamber is flush with the surface of the wall.

5. A device as defined in claim 1 in which said housing is in the form of a cross connection and in which each of the several openings of said chambers is disposed substantially at right angles with respect to the adjacent openings on either side thereof.

6. A device as defined in claim 1 including means operable from the exterior of the housing for adjusting the cross sectional area of said passage.

7. A device as defined in claim 6 in which said adjusting means is combined with throttling means for controlling the flow of fluid to said connecting device.

References Cited in the file of this patent
UNITED STATES PATENTS

| | | |
|---|---|---|
| 474,207 | Blattner | May 3, 1892 |
| 563,120 | Balthasar | June 20, 1896 |
| 749,503 | Tokheim | Jan. 12, 1904 |
| 828,138 | O'Neill | Aug. 7, 1906 |
| 1,236,160 | Gilbert | Aug. 7, 1917 |
| 1,290,722 | Doble | Jan. 7, 1919 |
| 1,361,124 | White | Dec. 7, 1920 |
| 1,831,713 | Knowlton | Nov. 10, 1931 |
| 1,833,068 | Caesar | Nov. 24, 1931 |
| 2,277,247 | Morse | Mar. 24, 1942 |
| 2,308,482 | Adams | Jan. 19, 1943 |
| 2,487,484 | Simpelaar | Nov. 18, 1949 |

FOREIGN PATENTS

| | | |
|---|---|---|
| 516,501 | Great Britain | of 1940 |
| 625,733 | France | Apr. 30, 1927 |